(12) United States Patent
Lin

(10) Patent No.: US 10,126,507 B1
(45) Date of Patent: Nov. 13, 2018

(54) SILICON-BASED MULTIPLEXER/DEMULTIPLEXER

(71) Applicant: INPHI CORPORATION, Santa Clara, CA (US)

(72) Inventor: Jie Lin, Santa Clara, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/025,890

(22) Filed: Jul. 2, 2018

Related U.S. Application Data

(63) Continuation of application No. 15/464,805, filed on Mar. 21, 2017, now Pat. No. 10,036,853.

(51) Int. Cl.
*G02B 6/12* (2006.01)
*G02B 6/293* (2006.01)

(52) U.S. Cl.
CPC ..... *G02B 6/29344* (2013.01); *G02B 6/12007* (2013.01); *G02B 6/2938* (2013.01); *G02B 6/29397* (2013.01); *G02B 2006/12061* (2013.01)

(58) Field of Classification Search
CPC ............ G02B 6/29344; G02B 6/12007; G02B 2006/12061
USPC .......................................................... 385/14
See application file for complete search history.

(56) References Cited

U.S. PATENT DOCUMENTS

| | | | | | |
|---|---|---|---|---|---|
| 5,499,308 | A | * | 3/1996 | Arai ................... | G02B 6/12007 385/15 |
| 2005/0213888 | A1 | * | 9/2005 | Bidnyk .............. | G02B 6/12007 385/47 |
| 2014/0368829 | A1 | * | 12/2014 | Dell ................... | G01N 21/7746 356/480 |

* cited by examiner

*Primary Examiner* — Jerry Blevins
(74) *Attorney, Agent, or Firm* — Richard T. Ogawa; Ogawa P.C.

(57) ABSTRACT

A multiplexer/demultiplexer for at least two wavelengths in O-band. The multiplexer/demultiplexer includes a silicon waveguide block having a first port, a second/third port respectively in bar/cross position at an opposing end plane relative to the first port. The silicon waveguide block is configured to provide a general interference excitation of a light wave of a first wavelength and a second wavelength respectively selected from two windows in O-band. The light wave is either inputted via the first port and split into a first output light of the first wavelength out of the second port and a second output light of the second wavelength out of the third port, or is combined of a first input light of the first wavelength from the second port and a second input light of the second wavelength from the third port and outputted via the first port with both wavelengths.

16 Claims, 5 Drawing Sheets

TM mode    1270nm

1310nm

SILICON-BASED MULTIPLEXER/DEMULTIPLEXER

CROSS-REFERENCE TO RELATED APPLICATIONS

This application is continuation of and claims priority to U.S. patent application Ser. No. 15/464,805, filed on Mar. 21, 2017, commonly assigned and incorporated by reference herein for all purposes.

BACKGROUND OF THE INVENTION

The present invention relates to a silicon photonics device. More particularly, the present invention provides a compact Si-based MMI Mux/Demux with low loss and high extinction ratio for two wavelengths in O-band.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Multiplexing has been employed to further expand the capacity of optical link. Wavelength division multiplexing (WDM) is one approach for transport optical signals with multiple wavelengths on a single fiber and wavelength multiplexer/demultiplexer (Mux/Demux) is a key device for handling such processes. Coarse wavelength division multiplexing (CWDM) is a form of multiplexing that uses a far broader photonic band spectrum with wider spacings between the wavelengths used than dense WDM (DWDM). For O-band of 1260-1360 nm, 4 CWDM channels of 20 nm channel spacing with center wavelengths at 1270 nm, 1290 nm, 1310 nm, and 1330 nm have widely adopted as a low-cost version of WDM for upstream transmission. The conventional Mux/Demux designs include Fiber Bragg Grating (FBG), Thin Film Filter (TFF), Array Waveguide Grating (AWG), waveguide-based delayed-line interferometer (DLI), and directional coupler (DC) while most have various drawbacks for O-band application especially for implementation of an optical transmission system based on highly integrated silicon photonics. FBG-based Mux/Demux requires additional optical circulator. TFF-based Mux/Demux has low loss but not easy to be integrated within a silicon photonics system. AWG-based Mux/Demux has high insertion loss and is usually temperature dependent so that the performance is poor. DLI-based Mux/Demux has an wavelength sensitive issue at O-band due to its involvement with multimode interference splitter and combiner. DC-based Mux has an issue of tight in processing tolerance and poor reproducibility.

Therefore, it is desired to develop improved compact Mux/Demux for splitting or combining two wavelengths in O-band.

BRIEF SUMMARY OF THE INVENTION

The present invention relates to photonic broadband communication device. More particularly, the present invention provides a Si-based two-wavelength Mux/Demux for O-band. Merely by example, the present invention discloses a compact multimode interference Mux/Demux based on standard 220 nm Silicon-on-Insulator (SOI) substrate with low transmission loss and high extinction ratio to combine/split to two beams of light respectively at two channel wavelengths in O-band either in Transverse Magnetic (TM) mode or Transverse Electric (TE) mode. The Si-based Mux/Demux can be integrated within a silicon photonics system in either a transmission path or reception path, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a multiplexer for at least two wavelengths in O-band. The multiplexer includes a silicon waveguide block bounded by a first end plane and a second end plane and two side planes. The multiplexer further includes a first port at the first end plane substantially aligned with one of the two side planes. The first port is coupled to a first waveguide. Additionally, the multiplexer includes a second port at the second end plane aligned with the same one of the two side planes at a bar position relative to the first port. The second port is coupled to a second waveguide. Furthermore, the multiplexer includes a third port at the second end plane separated from the second port and aligned with another one of the two side planes at a cross position relative to the first port. The third port is coupled to a third waveguide. The silicon waveguide block is configured to provide a general interference excitation of a light wave therein which combines a first input light with a first wavelength of O-band from the second waveguide via the second port and a second input light with a second wavelength of O-band from the third waveguide via the third port so that the light wave of both the first wavelength and the second wavelength is concentrated nearly 100% intensity at the first port to be outputted to the first waveguide.

In an alternative embodiment, the present invention provides a demultiplexer for at least two wavelengths in O-band. The demultiplexer includes a silicon waveguide block bounded by a first end plane and a second end plane and two side planes. The demultiplexer further includes a first port at the first end plane substantially aligned with one of the two side planes. The first port is coupled to a first waveguide. Additionally, the demultiplexer includes a second port at the second end plane substantially aligned with the same one of the two side planes at a bar position relative to the first port. The second port is coupled to a second waveguide. Furthermore, the demultiplexer includes a third port at the second end plane separated from the second port and substantially aligned with another side plane at a cross position relative to the first port. The third port is coupled to a third waveguide. The silicon waveguide block is configured to provide a general interference excitation of a light wave mixed with a first wavelength and a second wavelength of O-band received from the first waveguide via the first port to output nearly 50% intensity of the light wave as a first output light with the first wavelength via the second port into the second waveguide and nearly 50% intensity of the light wave as a second output light with the second wavelength via the third port into the third waveguide.

In another alternative embodiment, the present invention provides a silicon photonics system configured in a light transmission path. The silicon photonics system includes a first waveguide configured to be the light transmission path. Additionally, the silicon photonics system includes a second waveguide connected to a first laser source producing a first input light with a first wavelength in O-band. Furthermore, the silicon photonics system includes a third waveguide connected to a second laser source producing a second input light with a second wavelength in O-band. Moreover, the silicon photonics system includes a multiplexer configured as a silicon waveguide block of a thickness of about 220 nm in rectangular shape with a width for both a first end plane and a second end plane and a length for both a first side plane and a second side plane. The multiplexer includes a first port in the first end plane substantially aligned with the first side plane coupled to the first waveguide and a second port in the second end plane substantially aligned with the first side plane and coupled to the second waveguide to receive the first input light, and a third port in second end plane substantially aligned with the second side plane and coupled to the third waveguide to receive the second input light. The width and the length of the silicon waveguide block are configured to generate a general interference excitation of the first input light and the second input light and to output an output light of both the first wavelength and the second wavelength in O-band via the first port to the first waveguide.

In yet another alternative embodiment, the present invention provides a silicon photonics system configured in a light reception path. The silicon photonics system includes a first waveguide configured to be the light reception path for receiving an input light mixed with both a first wavelength and a second wavelength of O-band. The silicon photonics system further includes a second waveguide connected to a first detector and a third waveguide connected to a second detector. Additionally, the silicon photonics system includes a demultiplexer configured as a silicon waveguide block of a thickness of about 220 nm in rectangular shape with a width for both a first end plane and a second end plane and a length for both a first side plane and a second side plane. The demultiplexer includes a first port in the first end plane substantially aligned with the first side plane and coupled to the first waveguide, a second port in the second end plane substantially aligned with the first side plane and coupled to the second waveguide, and a third port in the second end plane substantially aligned with the second side plane and coupled to the third waveguide. The width and the length of the silicon waveguide block are configured to generate a general interference excitation of the input light of both the first wavelength and the second wavelength in O-band and to split nearly 50% intensity of the input light as a first output light with the first wavelength via the second port into the second waveguide and nearly 50% intensity of the input light as a second output light with the second wavelength via the third port into the third waveguide.

Many benefits of the Si-based two-wavelength Mux/Demux can be achieved with the present invention based on a silicon waveguide MMI block. As an example, using silicon material only is fully compatible with CMOS technology based on standard SOI wafer with a 200 nm Si-layer, which substantially simplifies the waveguide formation process and enhances production yield with high process tolerance. By utilizing general interference with mode excitations, the silicon waveguide MIMI block can be optimized with ultra compact width-length dimensions for achieving power/wavelength combining/splitting for two O-band channels (e.g., 1270 nm and 1310 nm) with 40 nm spacing either in TE polarization mode or in TM polarization mode. Further, the width-length dimensions of the MMI block can be easily reconfigured to be applicable for two other O-band channels (e.g., 1290 nm and 1330 nm). Additionally, the ultra compact size of the Si-based Mux/Demux can be used for cascading two-stage Mux/Demux for enhancing performance with much higher channel extinction ratio. Ultra-compact size also allows high-degree integration for silicon photonics system.

The present invention achieves these benefits and others in the context of disclosed multimode interference excitation technology in silicon waveguide block based on 220 nm SOI substrate. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
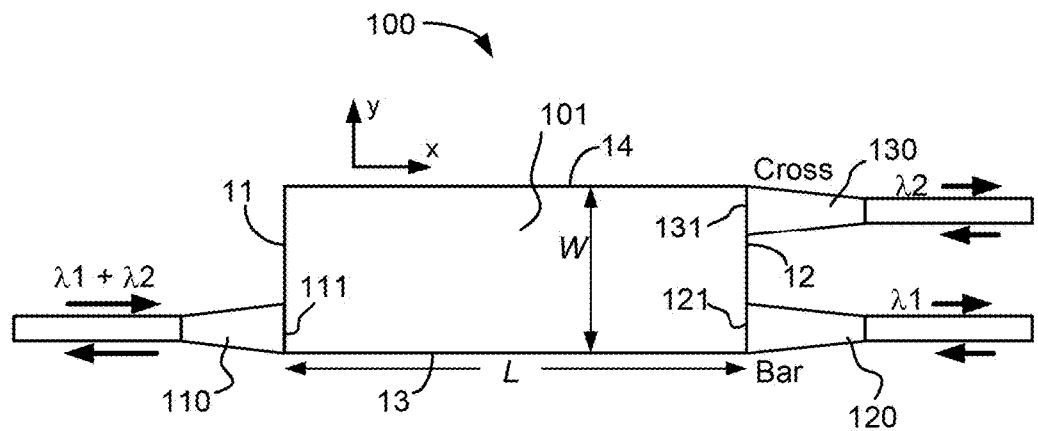
FIG. 1 is a simplified diagram of a general interference Si-based MMI waveguide Mux/Demux according to an embodiment of the present invention.

The present invention relates to photonic broadband communication device. More particularly, the present invention provides a Si-based two-wavelength Mux/Demux for O-band. Merely by example, the present invention discloses a compact multimode interference Mux/Demux based on standard 220 nm Silicon-on-Insulator (SOI) substrate with low transmission loss and high extinction ratio to combine/split to two beams of light respectively at two channel wavelengths in O-band either in Transverse Magnetic (TM) mode or Transverse Electric (TE) mode. The Si-based Mux/Demux can be integrated within a silicon photonics system in either a transmission path or reception path, though other applications are possible.

Integrated wavelength-division multiplexer (Mux) or demultiplexer (Demux) is a key element for handling expansion of optical transmission through silicon photonics circuit. It is highly desirable to design ultra-compact, simple process, and low loss Mux/Demux based on widely supplied standard silicon-on-insulator (SOI) wafer with 220 nm Si layer. Particularly for O-band window of 1260-1360 nm, this is lack behind. In the present disclosure, waveguide-based multiplexing or demultiplexing is achieved by utilizing a general interference excited multimode interferometer (MIMI) based structure. In the following sections, silicon general interference excited MIMI waveguide blocks with proper length are described in both polarizations. Particularly, the Si-based MIMI waveguide block is able to route signals in two wavelengths in O-band respectively to different output ports.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified diagram of a general interference Si-based MMI waveguide Mux/Demux according to an embodiment of the present invention. This diagram is merely an example, which should not unduly limit the scope of the claims. One of ordinary skill in the art would recognize many variations, alternatives, and modifications. As shown, a Si-based waveguide Mux/Demux device 100 comprises a planar waveguide block 101 of a certain thickness formed in rectangular shape of a width W and a length L bounded by a first end plane 11 and a second end plane 12 in y-direction and two side planes 13 and 14 in x-direction. Optionally, the planar waveguide block 101 is formed by directly processing a 220 nm Si layer of standard silicon-on-insulator (SOI) substrate. The planar waveguide block 101 is configured to have several optical ports for receiving light waves for generating multimode interference excitation within the rectangular shaped waveguide and for outputting one optical signal with combined wavelengths or two optical signals with separated wavelength. In an embodiment, a first port 111 is formed within the first end plane 11 for connecting externally to a first waveguide 110 via a natural extension substantially aligned with the first side plane 13. A second port 121 is formed within the second end plane 12 for connecting externally to a second waveguide 120 via a natural extension substantially aligned with the same first side plane 13. The second end plane 12 is opposed to the first end plane 11. The second port 121 is in bar position relative to the first port 111. A third port 131 is formed within the second end plane 12 and separated from the second port 121. The third port 131 is connected externally to a third waveguide 130 via a natural extension substantially aligned with the second side plane 14 which is opposed to the first side plane 13. The third port 131 is in cross position relative to the first port 111.

In an embodiment, for handling a light wave in a single polarization mode, TE or TM mode, by properly configuring the width W and the length L, the Si-based planar waveguide block 101 can be set in a general interference mode to excite multiple beats of images of the light wave of multiple wavelengths at various cross-section planes at various distances from the first end plane 11 to the second end plane 12. Since the beat length is wavelength dependent in one polarization, by properly design the width W and the length L, the intensity of a light wave signal having both a first wavelength $\lambda 1$ and a second wavelength $\lambda 2$ is excited to a maximum value substantially localized within a limited range of the first port 111 in the first end plane 11. The intensity of the signal with just the first wavelength $\lambda 1$ is excited to a maximum value substantially confined within a limited range of the second port 121 in the opposing second end plane 12. At the same time, intensity of the signal with just the second wavelength $\lambda 2$ is also excited to a maximum value substantially confined within a limited range of the third port 131 in the same second end plane 12 but with a spacing separated from the second port 121. Through the naturally extended waveguides 110, 120, and 130 respectively connected to the first port 111, second port 121, and third port 131, the Si-based planar waveguide block 100 is optionally configured to be a demultiplexer to route an input signal mixed with a first wavelength $\lambda 1$ and a second wavelength $\lambda 2$ received from the first waveguide 110 via the first port 111 separately as a first output signal of the first wavelength $\lambda 1$ to the second waveguide 120 via the second port 121 and a second output signal of the second wavelength $\lambda 2$ to the third waveguide 130 via the third port 131. Optionally, the Si-based planar waveguide block 101 can also be configured to be a multiplexer (Mux) device to combine two input signals in a same TE (or TM) polarization mode, a first input signal of the first wavelength λ1 received from the second waveguide via the second port 121 and the second input signal of the second wavelength λ2 received from the third waveguide via the third port 131, and to output a single output signal mixed with both the first wavelength λ1 and the second wavelength λ2 via the first port 111 into the first waveguide 110.

Figure 2A:
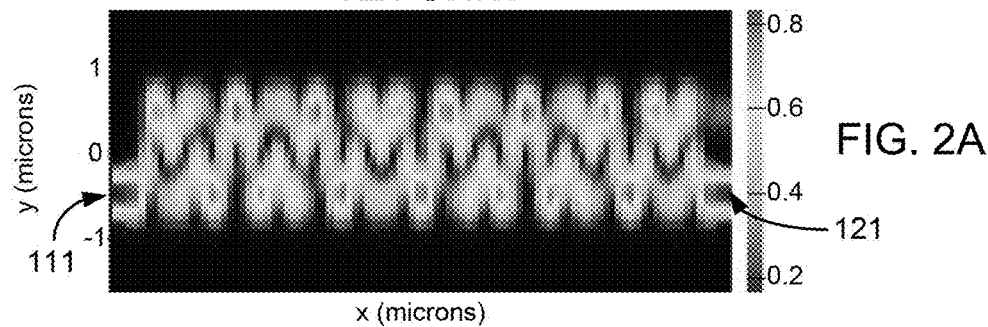
FIGS. 2A and 2B are exemplary diagrams of optical intensity distribution of (2A) a light wave of wavelength 1270 nm in TE mode and (2B) a light wave of wavelength 1310 nm in TE mode through the Si-based Mux/Demux device of FIG. 1 according to an embodiment of the present invention.
Figure 2B:
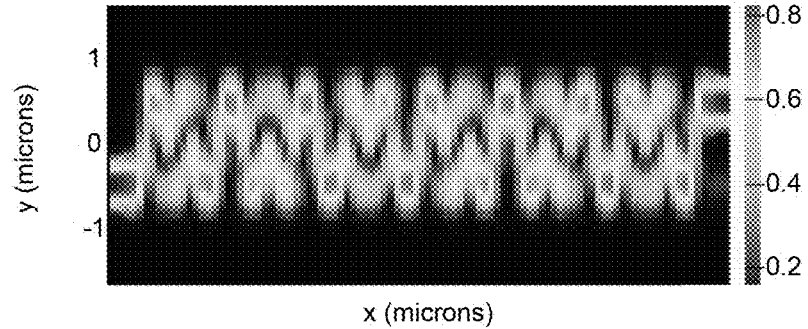

FIGS. 2A and 2B are exemplary diagrams of optical intensity distribution of (2A) a light wave of wavelength 1270 nm in TE mode and (B) a light wave of wavelength 1310 nm in TE mode through the Si-based Mux/Demux device of FIG. 1 according to an embodiment of the present invention. As shown in FIG. 2A, general interference excitations of a light wave of one wavelength in O-band around 1270 nm in TE polarization mode within the Si-based planar waveguide block 101 causes a varied spatial intensity distribution along the length L and width W. By properly configuring the length L and width W, the resultant intensity distribution of the interference wave yields only two edge spots in opposing end planes of the planar waveguide block 101 (See FIG. 1). At each edge spot, substantially full optical intensity of the light wave is concentrated within a local region that is available to be coupled with an external waveguide for outputting (or inputting) the light wave. Referring to FIG. 1, one of the two edge spots in the first end plane 11 is located at the first port 111 connected to the first waveguide 110 and another of the two edge spots in the opposing second end plane 12 is located at the second port 121 connected to the second waveguide 120 at the bar position relative to the first port 111. As shown in FIG. 2B, for the same width-length configuration of the planar waveguide block 101, general interference excitations of a light wave of another wavelength in O-band around 1310 nm in TE polarization mode causes a varied spatial intensity distribution that is different from that for the light wave of 1270 nm, yielding substantially full optical intensity of the light wave at two edge spots, one being the same edge spot within the first port 111 in the first end plane 11 coupled to the first waveguide 110 and another being within the third port 131 in the second end plane 12 coupled to the third waveguide 130 at the cross position relative to the first port 111 (see FIG. 1).

In an embodiment, the Si-based waveguide Demux device 100 is configured to receive a light wave mixed with a first wavelength around 1270 nm and a second wavelength around 1310 nm in TE polarization mode via the first port 111 from the first waveguide 110. The light wave travels through the planar waveguide in the general interference excitation mode from the first end plane 11 to the second end plane 12. Because of the wavelength dependency of the interference intensity distribution under a proper width-length configuration of the planar waveguide block 101 described above, the second port 121 in the second end plane 12 at the bar position relative to the first port 111 is able to output a first output light with substantially only the first wavelength around 1270 nm in TE mode to the second waveguide 120 and the third port 131 in the second end plane 12 at the cross position is able to output a second output light with substantially only the second wavelength around 1310 nm in TE mode to the third waveguide 130. In another embodiment, the Si-based planar waveguide block 101 can be configured to be a Mux device to receive a first input light of a first wavelength around 1270 nm in TE mode via the first port 121 from the second waveguide 120 and at the same time receive a second input light of a second wavelength around 1310 nm in TE mode via the third port 131 from the third waveguide 130. A combined light wave of the first input light and the second input light travels through the Si-based planar waveguide block 101 in the general interference excitation mode from the second end plane 12 to the first end plane 11. Finally, the first port 111 is configured to output the combined light with both the first wavelength 1270 nm and the second wavelength 1310 nm to the first waveguide 110.

Figure 3A:
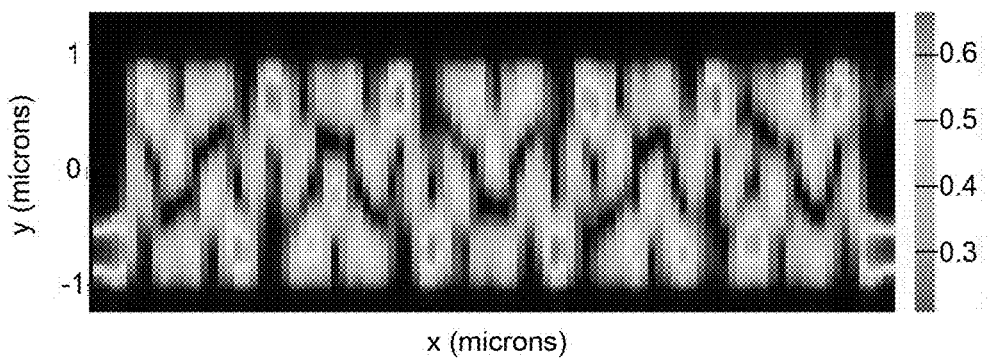
FIGS. 3A and 3B are exemplary diagrams of optical intensity distribution of (3A) a light wave of wavelength 1270 nm in TM mode and (3B) a light wave of wavelength 1310 nm in TM mode through the Si-based Mux/Demux device of FIG. 1 according to an embodiment of the present invention.
Figure 3B:
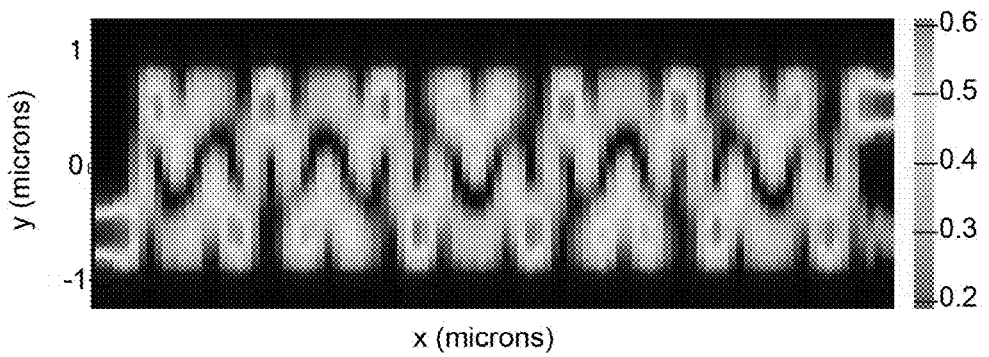

Because the index varies with wavelength differently for light wave in TE mode from light wave in the TM mode, the Si-based planar waveguide block 101 can be also configured as a Mux/Demux device for combining/splitting the same two wavelengths of 1270 nm and 1310 nm in O-band in TM mode but with slightly different width-length configuration. FIGS. 3A and 3B are exemplary diagrams of optical intensity distribution of (3A) a light wave of wavelength 1270 nm in TM mode and (3B) a light wave of wavelength 1310 nm in TM mode through the Si-based Mux/Demux device of FIG. 1 according to an embodiment of the present invention. As shown, the general interference excitation still applies for the Si-based planar waveguide block 101 to handle multiplexing and demultiplexing of light waves of at least two wavelengths in TM mode the same as two wavelengths in TE mode. Detailed description is omitted.

In an embodiment, a silicon-on-insulator (SOI) substrate is used for forming the Si-based planar waveguide block that is configured to form a Mux/Demux device. The SOI substrate is a standard one having a silicon layer of 220 nm in thickness formed on a thick insulator (silicon oxide) layer. The 220 nm thick Si layer is used to form the planar waveguide block 101 as well as other waveguides with a common height of 220 nm. The planar waveguide block 101 is patterned as a rectangular shape having a width W and a length L, as seen in FIG. 1. The other waveguides includes the first waveguide 110 coupled to the first port 111, the second waveguide 120 coupled to the second port 121, and the third waveguide 130 coupled to the third port 131. In particular, the common height of these waveguides is much smaller than most state-of-art multimode interference coupler waveguides. Each of the other waveguides is for transmitting light wave of one or more wavelengths. Optionally, each of the other waveguides includes a tapper shaped section that is naturally extended from the planar waveguide block from one corresponding port and further extended with a linear waveguide of an arbitrary length depended how the Si-based Mux/Demux device 100 is integrated in a silicon photonics system.

Referring to FIGS. 1, 2A, 2B, 3A and 3B, in an example, the width W is set with an ultra-compact value in a range from 1.5 μm to 2.0 μm and the length L is optimized with a compact size in a range from 125 μm to 135 μm for providing the general interference excitation of the light wave in either TE polarization mode or TM polarization mode in the silicon-based planar waveguide block 101 with the first wavelength at about 1270 nm and the second wavelength at about 1310 nm. In an embodiment, for an optimized width-length configuration of the Si-based waveguide Mux device 100 with a standard height of 220 nm Si-layer of a SOI substrate, the light wave of both the first wavelength and the second wavelength in either TE polarization mode or TM polarization mode is outputted from the first port 111 into the first waveguide 110 with a transmission loss less than 0.6 dB respectively for the first input light over a wavelength range of 1270 nm±6 nm received via the second port 121 from the second waveguide 120 and the second input light over a wavelength range of 1310 nm±6 nm received via the third port 131 from the third waveguide 130. In an embodiment, the width W optimized for the light wave in the TE polarization mode with the first wavelength at about 1270 nm and the second wavelength at about 1310 nm is smaller than that optimized for the light wave in the TM polarization mode with the same two wavelengths. The length L optimized for the light wave in the TE polarization mode with the first wavelength at about 1270 nm and the second wavelength at about 1310 nm is greater than that optimized for the light wave in the TM polarization mode with the same two wavelengths.

Figure 4:
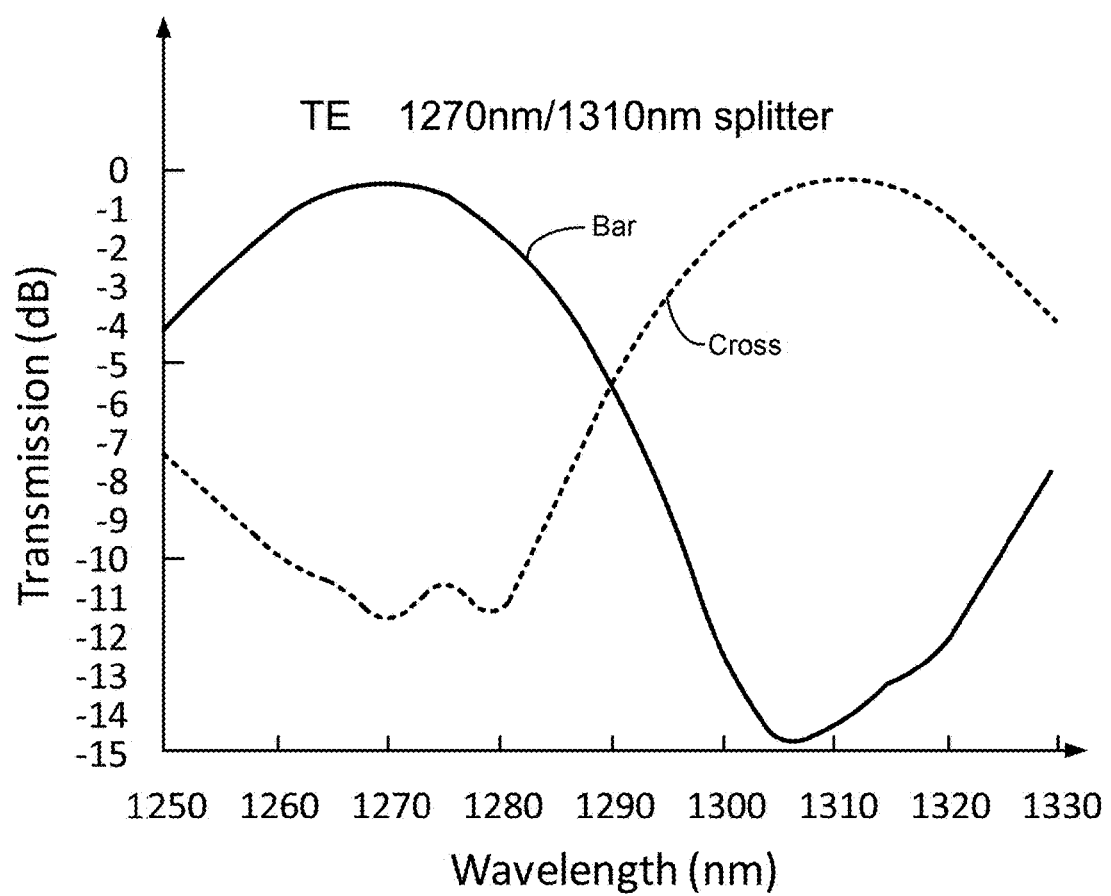
FIG. 4 is an exemplary plot of transmission loss for demultiplexing two wavelengths around 1270 nm and 1310 nm in TE mode by the Demux device of FIG. 1 according to an embodiment of the present invention.

In another embodiment, for an optimized width-length configuration of the Si-based waveguide Demux device 100 with a standard height of 220 nm Si-layer of a SOI substrate, the light wave combined the first wavelength and the second wavelength is split into the first output light into the second waveguide 120 with a transmission loss less than 0.7 dB over 1270 nm±6 nm range and the second output light into the third waveguide 130 with a transmission loss less than 0.6 dB over 1310 nm±6 nm range. FIG. 4 is an exemplary plot of transmission loss for demultiplexing two wavelengths around 1270 nm and 1310 nm in TE mode by the Demux of FIG. 1 according to an embodiment of the present invention. As shown, the solid curve represents the optical power outputted via the second port at the bar position relative to the first port. The transmission loss is less than 0.7 dB for the light wave with wavelengths in a range of 1270 nm 6 nm to travel from the first port to the second port at the bar position but is greater than 12 dB for the light wave with wavelength with wavelengths in a range of 1310 nm±6 nm to travel the same path. The dotted curve represents the optical power outputted via the third port at the cross position relative to the first port. The transmission loss is less than 0.6 dB for the light wave with wavelengths in a range of 1310 nm±6 nm to travel from the first port to the third port at the cross position but is greater than 10 dB for the light wave with wavelengths in a range of 1270 nm±6 nm to travel the same path. Therefore, the Si-based waveguide Demux device 100 effectively split the light wave with two wavelengths in O-band with low insertion loss. Note, both the light in 1270 nm range and the light in 1310 nm range are in TE polarization mode.

Figure 5:
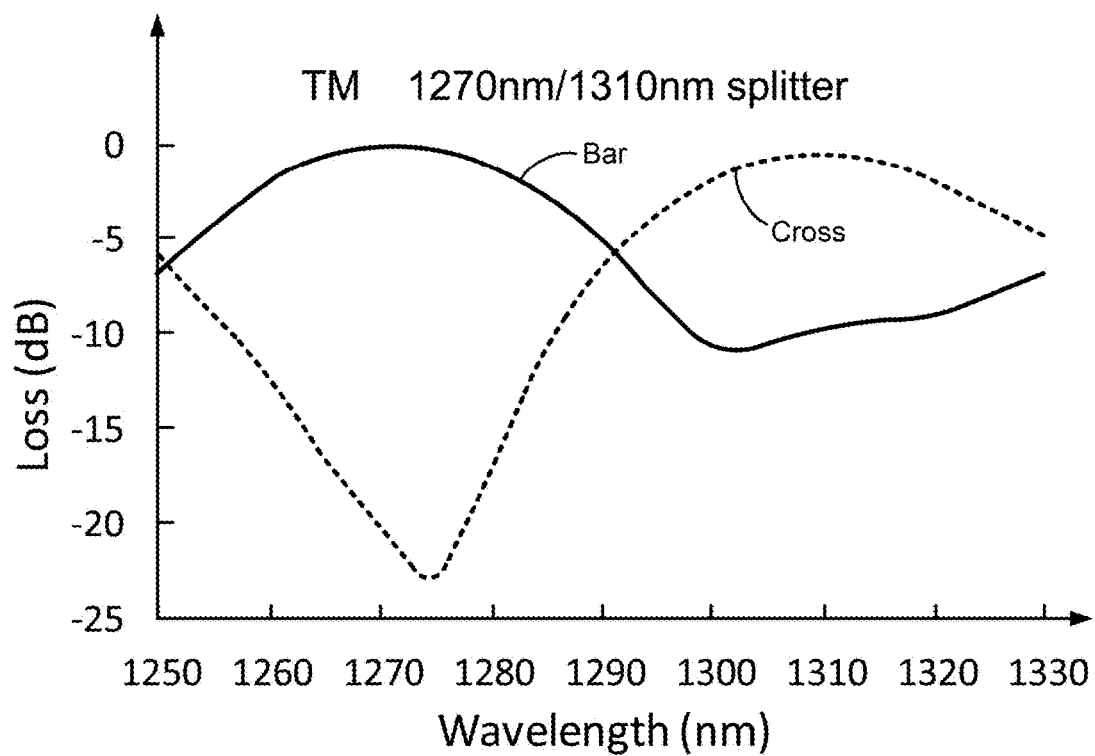
FIG. 5 is an exemplary plot of transmission loss for demultiplexing two wavelengths around 1270 nm and 1310 nm in TM mode by the Demux device of FIG. 1 according to an embodiment of the present invention.

In yet another embodiment, the Si-based Demux device 100 with an alternatively optimized width-length configuration with standard 220 nm Si-layer thickness is configured to split the light of 1270 nm and the light of 1310 nm are in TM mode. FIG. 5 is an exemplary plot of transmission loss for demultiplexing two wavelengths around 1270 nm and 1310 nm in TM mode by the Demux device of FIG. 1 according to an embodiment of the present invention. As shown, the solid curve represents the optical power outputted via the second port at the bar position relative to the first port. The transmission loss is less than 0.7 dB for the light wave with wavelengths in a range of 1270 nm±6 nm to travel from the first port to the second port at the bar position but is greater than 9 dB for the light wave with wavelengths in a range of 1310 nm±6 nm to travel the same path. The dotted curve represents the optical power outputted via the third port at the cross position relative to the first port. The transmission loss is less than 0.8 dB for the light wave with wavelengths in a range of 1310 nm±6 nm to travel from the first port to the third port at the cross position but is greater than 15 dB for the light wave with wavelengths in a range of 1270 nm±6 nm to travel the same path. Note, Note, both the light in 1270 nm range and the light in 1310 nm range are in TM polarization mode.

In still another embodiment, the Si-based planar waveguide block 101 can be configured to have a different width-length configuration to provide a general interference excitation of the light wave in either TE polarization mode or TM polarization mode in the silicon waveguide block with the first wavelength at about 1290 nm and the second wavelength at about 1330 nm. Similarly, this Si-based planar wavelength block 101 can be applied as a Mux device for combining two light waves with respective wavelengths of 1290 nm±6 nm and 1330 nm±6 nm into one light wave in one waveguide with an insertion loss less than 0.7 dB. Alternatively, this Si-based planar wavelength block 101 can be applied as a Demux device for splitting a light wave with the two wavelengths of 1290 nm±6 nm and 1330 nm±6 nm into a first light wave with wavelengths of 1290 nm±6 nm and a second light wave with wavelengths of 1330 nm±6 nm with an insertion loss less than 0.7 dB.

Optionally, with alternatively optimized width-length configuration of a standard 220 nm Si-layer on SOI substrate, the Si-based waveguide Mux/Demux device 100 can be configured to handle two O-band wavelengths with 20 nm spacing. For example, the first wavelength is selected to be 1270±6 nm while the second wavelength can be 1290±6 nm. In another example, the first wavelength is selected to be 1290±6 nm while the second wavelength can be 1310±6 nm. In yet another example, the first wavelength is selected to be 1310±6 nm while the second wavelength can be 1330±6 nm. Optionally, with another alternatively optimized width-length configuration of a standard 220 nm Si-layer on SOI substrate, the Si-based waveguide Mux/Demux device 100 can be configured to handle two O-band wavelengths with 60 nm spacing, the first wavelength being at 1270±6 nm and the second wavelength being at 1330±6 nm.

Figure 6:
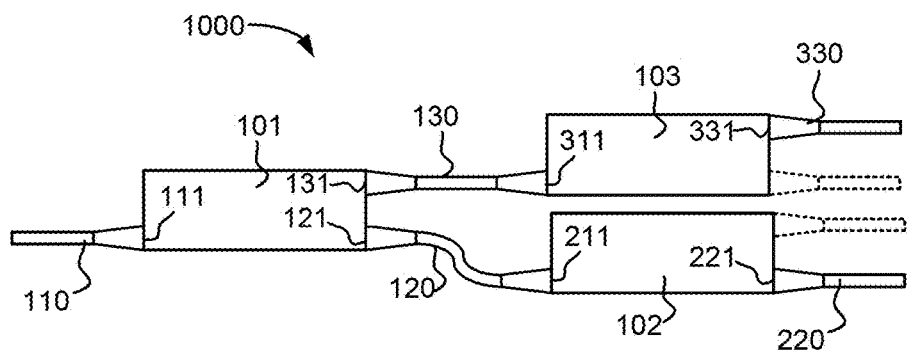
FIG. 6 is a schematic diagram of a Mux/Demux device with three Si-based waveguide blocks of FIG. 1 cascaded in two stages according to an embodiment of the present invention.

FIG. 6 is a schematic diagram of a Mux/Demux device with three Si-based waveguide blocks of FIG. 1 cascaded in two stages according to an embodiment of the present invention. This diagram is merely an example, which should not unduly limit the scope of the claims. One of ordinary skill in the art would recognize many variations, alternatives, and modifications. As shown, the Mux/Demux device 1000 is a Si-based waveguide device that is formed by cascading three Si-based Mux/Demux devices 100 of FIG. 1 in two stages. In particular, a first Si-based planar waveguide block 101 is provided as a rectangular shape of a certain height bounded by a first end plane, a second end plane opposed to the first end plane, a first side plane, and a second side plane opposed to the first side plane to serve as a first-stage Mux/Demux device. The first Si-based planar waveguide block 101 is configured with a first port 111 at the first end plane aligned to the first side plane and coupled to a first waveguide 110. The first Si-based planar waveguide block 101 also is configured to have a second port 121 and a third port 131 at the second end plane respectively aligned to the first side plane and the second side plane and respectively coupled to a second waveguide 120 and a third waveguide 130.

Referring to FIG. 6, a second Si-based planar waveguide block 102 is provided as a second-stage Mux/Demux device to cascade with the first Si-based planar waveguide block 101. In particular, the second Si-based planar waveguide block 102 is configured with a fourth port 211 to couple with the second waveguide 120 and a fifth port 221 to couple with a fourth waveguide 220. The second Si-based planar waveguide block 102 is substantially similar to the first Si-based planar waveguide block 101 such that the fourth port 211 is substantially similar to the first port 111 and the fifth port 221 is substantially similar to the second port 121. The second port 121 is at a bar position relative to the first port 111 and the fifth port 221 is also at a bar position relative to the fourth port 211. Provided that the first Si-based planar waveguide block 101 is configured to pass a light wave of a first wavelength range of O-band from the first port 111 to the second port 121 at the bar position, the second Si-based planar waveguide block 102, configured the same way as the first Si-based planar waveguide block 101, shall perform the same way to further pass the light wave from the fourth port 211 to the fifth port 221 at the bar position. Since the second Si-based planar waveguide block 102 only receive the light wave of the same first wavelength range of O-band that is only coupled to a port at a bar position, the second Si-based planar waveguide block 102 can be set to not couple any additional waveguide at a cross position unlike that the first Si-based planar waveguide block 101 is also coupled to the third waveguide 130 via the third port 131 at the cross position relative to the first port 111. This can substantially increase the extinction ratio for light wave of a second wavelength range other than the first wavelength range of O-band in a bar path from the first port 111 to the fifth port 221 through the two-stage Mux/Demux device 1000. In an alternative view, the second Si-based planar waveguide 102 is cascaded in series between the second waveguide and the second port of the first Si-based planar waveguide 101.

Referring to FIG. 6 again, a third Si-based planar waveguide block 103 is provided as a second-stage Mux/Demux device to cascade with the first Si-based planar waveguide block 101. In particular, the third Si-based planar waveguide block 103 is configured with a sixth port 311 to couple with the third waveguide 130 and a seventh port 321 to couple with a fifth waveguide 320. The third Si-based planar waveguide block 103 is substantially similar to the first Si-based planar waveguide block 101 such that the sixth port 311 is substantially similar to the first port 111 and the seventh port 331 is substantially similar to the third port 131. The third port 131 is at a cross position relative to the first port 111 and the seventh port 331 is also at a cross position relative to the sixth port 311. Provided that the first Si-based planar waveguide block 101 is configured to pass a light wave of a second wavelength range of O-band (separated from the first wavelength range) from the first port 111 to the through port 131 at the cross position, the third Si-based planar waveguide block 103, configured the same way as the first Si-based planar waveguide block 101, shall perform the same way to further pass the light wave from the sixth port 311 to the seventh port 321 at the cross position. Since the third Si-based planar waveguide block 103 only receive the light wave of the same second wavelength range of O-band that is only coupled to a port at a cross position, the third Si-based planar waveguide block 103 can be set to not couple any additional waveguide at a bar position unlike that the first Si-based planar waveguide block 101 is also coupled to the second waveguide 120 via the second port 131 at the bar position relative to the first port 111. This can substantially increase the extinction ratio for light wave of the first wavelength range other than the second wavelength range of O-band in a cross path from the first port 111 to the seventh port 321 through the two-stage Mux/Demux device 1000. Since each of the three Si-based planar waveguide blocks are configured with ultra-compact size for multiplexing/demultiplexing two wavelengths (ranges) of O-band, the 2-stage Mux/Demux device 1000 is still substantially compact in size that can laid on a same SOI substrate no greater than 400 nm in length. In an alternative view, the third Si-based planar waveguide 103 is cascaded in series between the third waveguide and the third port of the first Si-based planar waveguide 101.

Figure 7A:
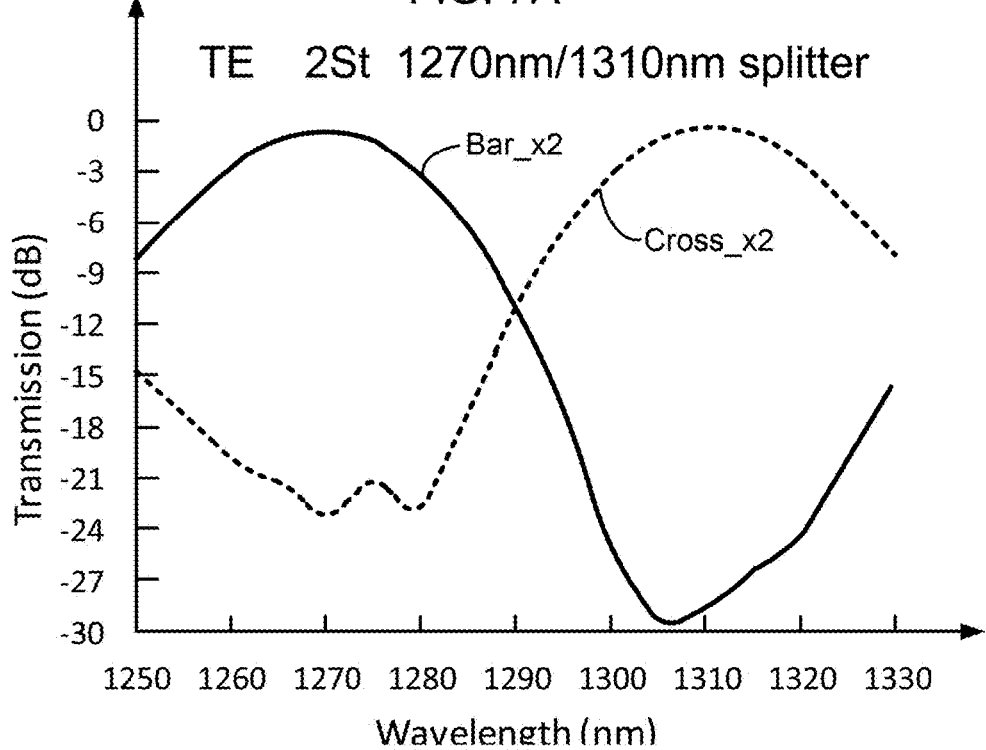
FIGS. 7A and 7B are exemplary plots of transmission loss for demultiplexing (7A) two wavelengths around 1270 nm and 1310 nm in TE mode and (7B) two wavelengths around 1270 nm and 1310 nm in TE mode by a two-stage Demux device according to an embodiment of the present invention.
Figure 7B:
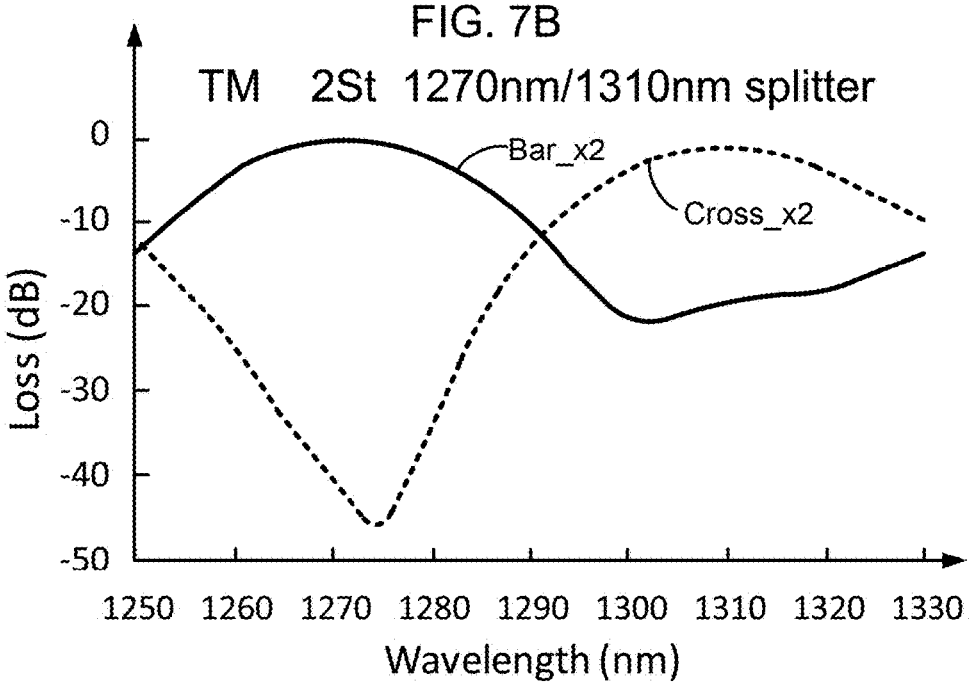

FIGS. 7A and 7B are exemplary plots of transmission loss for demultiplexing (7A) two wavelengths around 1270 nm and 1310 nm in TE mode and (7B) two wavelengths around 1270 nm and 1310 nm in TE mode by a two-stage Demux device according to an embodiment of the present invention. As shown in FIG. 7A, the transmission loss is plotted for light wave across entire O-band in TE mode through the bar path and the cross path of the two stage Demux device 1000 as described in FIG. 6. For light with wavelengths in a range of 1270 nm±6 nm, the transmission loss through the bar path is less than 1.5 dB and the transmission loss through the cross path is greater than 21 dB. For light with wavelengths in a range of 1310 nm±6 nm, the transmission loss through the bar path is greater than 24 dB and the transmission loss through the cross path is less than 1.5 dB. Thus, the bar path effectively has a high extinction ratio for light with wavelengths in a range of 1310 nm±6 nm and the cross path effective has a high extinction ratio for light with wavelength in a range of 1270 nm±6 nm. Therefore, the 2-stage Demux device just provides a compact size, high performance O-band Demux device 1000 for demultiplexing light waves in two wavelength ranges of O-band: 1270 nm±6 nm and 1310 nm±6 nm. Both are in TE mode. Optionally, the same device works as a Mux device with light waves travel in opposite direction from the fifth port and seventh port to the first port.

As shown in FIG. 7B, the transmission loss is plotted for light wave across entire O-band in TM mode through the bar path and the cross path of the two stage Demux device 1000 as described in FIG. 6. For light with wavelengths in a range of 1270 nm±6 nm, the transmission loss through the bar path is less than 1.5 dB and the transmission loss through the cross path is greater than 30 dB. For light with wavelengths in a range of 1310 nm±6 nm, the transmission loss through the bar path is greater than 21 dB and the transmission loss through the cross path is less than 1.5 dB. Thus, the bar path effectively has a high extinction ratio over 30 dB for light with wavelengths in a range of 1310 nm±6 nm and the cross path effective has a high extinction ratio over 21 dB for light with wavelength in a range of 1270 nm±6 nm. Therefore, the 2-stage Demux device just provides a compact size, high performance O-band Demux device 1000 for demultiplexing light waves in two wavelength ranges of O-band: 1270 nm±6 nm and 1310 nm±6 nm. Both are in TE mode. Optionally, the same device works as a Mux device with light waves travel in opposite direction from the fifth port and seventh port to the first port.

Optionally, the three Si-based planar waveguide blocks can be configured to form a 2-stage Mux/Demux device for multiplexing/demultiplexing two wavelengths (ranges) of O-band at 1290 nm±6 nm and 1330 nm±6 nm. The optical performance in terms of insertion loss and extinction ratio is substantially similar to what is disclosed above.

In an alternative embodiment, the present disclosure provides an integrated silicon photonics system that substantially obviate one or more of the problems due to limitations and disadvantages of the related art. Optionally, the integrated silicon photonics system is provided in a light transmission path formed in terms of Si-based waveguide on a SOI substrate. The integrated silicon photonics system includes a first waveguide configured to be the light transmission path and a second waveguide connected to a first laser source producing a first input light with a first wavelength in O-band. The integrated silicon photonics system further includes a third waveguide connected to a second laser source producing a second input light with a second wavelength in O-band. Additionally, the integrated silicon photonics system includes a multiplexer configured as a silicon waveguide block of a thickness of about 220 nm in rectangular shape with a width for both a first end plane and a second end plane and a length for both a first side plane and a second side plane. The multiplexer includes a first port in the first end plane substantially aligned with the first side plane coupled to the first waveguide, a second port in the second end plane substantially aligned with the first side plane and coupled to the second waveguide to receive the first input light, and a third port in the second end plane substantially aligned with the second side plane and coupled to the third waveguide to receive the second input light. The width and the length of the silicon waveguide block are configured to generate a general interference excitation of the first input light and the second input light and to output an output light of both the first wavelength and the second wavelength in O-band via the first port to the first waveguide. The multiplexer is substantially the same as the Si-based waveguide Mux device 100 described in FIG. 1. The first wavelength and the second wavelength in O-band are all either in TE polarization mode or TM polarization mode. The first wavelength is selected from a window of 1270 nm±6 nm and the second wavelength is selected from a window of 1310 nm±6 nm. Alternatively, the first wavelength is selected from a window of 1290 nm±6 nm and the second wavelength is selected from a window of 1330 nm 6 nm. Optionally, the multiplexer comprises a two-stage Mux device including a first-stage Si-based waveguide Mux device coupled to two second-stage Si-based waveguide Mux devices for achieving 21 dB or greater high extinction ratio between two wavelengths respectively selected from two O-band windows while only having less than 1.5 dB transmission loss for each of the two wavelengths respectively through a bar path and a cross path.

Optionally, the integrated silicon photonics system includes a first waveguide configured to be the light reception path for receiving an input light mixed with both a first wavelength and a second wavelength of O-band. Further the integrated silicon photonics system includes a second waveguide connected to a first detector and a third waveguide connected to a second detector. Additionally, the integrated silicon photonics system includes a demultiplexer configured as a silicon waveguide block of a thickness of about 220 nm in rectangular shape with a width for both a first end plane and a second end plane and a length for both a first side plane and a second side plane. The demultiplexer includes a first port in the first end plane substantially aligned with the first side plane and coupled to the first waveguide, a second port in the second end plane substantially aligned with the first side plane and coupled to the second waveguide, and a third port in the second end plane substantially aligned with the second side plane and coupled to the third waveguide. The width and the length of the silicon waveguide block are configured to generate a general interference excitation of the input light of both the first wavelength and the second wavelength in O-band and to split nearly 50% intensity of the input light as a first output light with the first wavelength via the second port into the second waveguide and nearly 50% intensity of the input light as a second output light with the second wavelength via the third port into the third waveguide. The multiplexer is substantially the same as the Si-based waveguide Demux device 100 described in FIG. 1. The first wavelength and the second wavelength in O-band are all either in TE polarization mode or TM polarization mode. The first wavelength is selected from a window of 1270 nm±6 nm and the second wavelength is selected from a window of 1310 nm±6 nm. Alternatively, the first wavelength is selected from a window of 1290 nm±6 nm and the second wavelength is selected from a window of 1330 nm±6 nm. Optionally, the multiplexer comprises a two-stage Demux device including a first-stage Si-based waveguide Demux device coupled to two second-stage Si-based waveguide Demux devices for achieving 21 dB or greater high extinction ratio between two wavelengths respectively selected from two O-band windows while only having less than 1.5 dB transmission loss for each of the two wavelengths respectively through a bar path and a cross path.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method for forming a multiplexer in O-band comprising:
    forming a silicon waveguide block in a rectangular shape based on a silicon layer of a thickness of a silicon-on-insulator (SOI) substrate bounded by a first end plane and a second end plane and two side planes;
    forming a first port at the first end plane substantially aligned with one of the two side planes;
    forming a second port at the second end plane aligned with the same one of the two side planes at a bar position relative to the first port;
    forming a third port at the second end plane separated from the second port and aligned with another one of the two side planes at a cross position relative to the first port; and
    configuring the silicon waveguide block to provide a general interference excitation of a light wave therein which combines a first input light with a first wavelength of O-band received by the second port and a second input light with a second wavelength of O-band received by the third port so that the light wave of both the first wavelength and the second wavelength is outputted to the first port with substantially 100% intensity.

2. The method of claim 1, wherein the forming a silicon waveguide block comprises patterning the silicon layer in the rectangular shape having a width set for both the first end plane and the second end plane and a length set for the two side planes; wherein the thickness of the SOI substrate is 220 nm.

3. The method of claim 2, wherein the patterning the silicon layer comprises limiting the width in a range from 1.5 µm to 2.0 µm and the length in a range from 125 µm to 135 µm for providing the general interference excitation of the light wave in either TE polarization mode or TM polarization mode in the silicon waveguide block with the first wavelength at about 1270 nm and the second wavelength at about 1310 nm.

4. The method of claim 3, wherein the width optimized for the light wave in the TE polarization mode with the first wavelength at about 1270 nm and the second wavelength at about 1310 nm is smaller than that optimized for the light wave in the TM polarization mode with the same two wavelengths.

5. The method of claim 3, wherein the length optimized for the light wave in the TE polarization mode with the first wavelength at about 1270 nm and the second wavelength at about 1310 nm is greater than that optimized for the light wave in the TM polarization mode with the same two wavelengths.

6. The method of claim 3, wherein the light wave of both the first wavelength and the second wavelength in either TE polarization mode or TM polarization mode is outputted at the first output port with a transmission loss less than 0.7 dB respectively from the second port to the first port for the first input light over 1270 nm±6 nm range and from the third port to the first port for the second input light over 1310 nm±6 nm range.

7. The method of claim 2, wherein the patterning the silicon layer comprises providing a general interference excitation of the light wave in either TE polarization mode or TM polarization mode in the silicon waveguide block with the first wavelength at about 1290 nm and the second wavelength at about 1330 nm.

8. The method of claim 2, wherein the patterning the silicon layer comprises providing a general interference excitation of the light wave in either TE polarization mode or TM polarization mode in the silicon waveguide block with the two wavelengths in O-band with 20 nm spacing, the two wavelengths being selected among 1270 nm, 1290 nm, 1310 nm, and 1330 nm.

9. The method of claim 2, wherein the patterning the silicon layer comprises providing a general interference excitation of the light wave in either TE polarization mode or TM polarization mode in the silicon waveguide block with the first wavelength at about 1270 nm and the second wavelength at about 1330 nm.

10. A method for forming a demultiplexer in O-band comprising:
forming a silicon waveguide block in a rectangular shape based on a silicon layer of a thickness of a silicon-on-insulator (SOI) substrate bounded by a first end plane and a second end plane and two side planes;
forming a first port at the first end plane substantially aligned with one of the two side planes;
forming a second port at the second end plane substantially aligned with the same one of the two side planes at a bar position relative to the first port;
forming a third port at the second end plane separated from the second port and substantially aligned with another side plane at a cross position relative to the first port; and
configuring the silicon waveguide block to provide a general interference excitation of a light wave received by the first port mixed with a first wavelength and a second wavelength of O-band received by the first port to respectively output nearly 50% intensity of the light wave as a first output light with the first wavelength to the second port and nearly 50% intensity of the light wave as a second output light with the second wavelength to the third port.

11. The method of claim 10, wherein the forming a silicon waveguide block comprises patterning the silicon layer in the rectangular shape having a width set for both the first end plane and the second end plane and a length set for the two side planes.

12. The method of claim 11, wherein the patterning the silicon layer comprises limiting the width in a range from 1.5 μm to 2.0 μm and the length in a range from 125 μm to 135 μm for providing the general interference excitation of the light wave in either TE polarization mode or TM polarization mode in the silicon waveguide block with the first wavelength at about 1270 nm and the second wavelength at about 1310 nm.

13. The method of claim 12, wherein the light wave of the first wavelength and the second wavelength is split into the first output light into the second waveguide with a transmission loss less than 0.7 dB over 1270 nm±6 nm range from the first port to the second port and the second output light into the third waveguide with a transmission loss less than 0.7 dB over 1310 nm±6 nm range from the first port to the third port.

14. The method of claim 11, wherein the patterning the silicon layer comprises reconfiguring the width and the length of the silicon waveguide block to provide the general interference excitation of the light wave in either TE polarization mode or TM polarization mode therein with the first wavelength at about 1290 nm and the second wavelength at about 1330 nm.

15. The method of claim 11, wherein the patterning the silicon layer comprises configuring the width and the length of the silicon waveguide block to provide a general interference excitation of the light wave in either TE polarization mode or TM polarization mode in the silicon waveguide block with the two wavelengths in O-band with 20 nm spacing, the two wavelengths being selected among 1270 nm, 1290 nm, 1310 nm, and 1330 nm.

16. The method of claim 11, wherein the patterning the silicon layer comprises configuring the width and the length of the silicon waveguide block to provide a general interference excitation of the light wave in either TE polarization mode or TM polarization mode in the silicon waveguide block with the first wavelength at about 1270 nm and the second wavelength at about 1330 nm.

* * * * *